United States Patent
Elgner et al.

(10) Patent No.: US 6,833,103 B2
(45) Date of Patent: Dec. 21, 2004

(54) PRESSLESS BLOW MOLDING

(75) Inventors: Roger Elgner, Woodbridge (CA); Changize Sadr, North York (CA)

(73) Assignee: Salflex Polymers Ltd., Weston (CA)

( * ) Notice: Subject to any disclaimer, the term of this patent is extended or adjusted under 35 U.S.C. 154(b) by 162 days.

(21) Appl. No.: 10/071,231

(22) Filed: Feb. 11, 2002

(65) Prior Publication Data

US 2003/0151169 A1 Aug. 14, 2003

(51) Int. Cl.⁷ .................. B29C 49/04; B29C 49/30; B29C 49/48; B29C 49/56
(52) U.S. Cl. .............. 264/540; 264/542; 425/195; 425/555; 425/532; 425/541
(58) Field of Search ................. 264/540, 542, 264/537; 425/195, 522, 532, 541, 540

(56) References Cited

U.S. PATENT DOCUMENTS

| | | | | |
|---|---|---|---|---|
| 656,505 A | * | 8/1900 | Brannagan | 425/541 |
| 3,972,668 A | * | 8/1976 | Cessna, Jr. | 425/450.1 |
| 4,362,688 A | * | 12/1982 | Nakagawa | 425/532 |
| 4,681,526 A | * | 7/1987 | Lupke | 425/532 |
| 5,264,178 A | * | 11/1993 | Yamamura et al. | 264/540 |
| 5,306,325 A | * | 4/1994 | Smith et al. | 425/541 |
| 6,113,841 A | * | 9/2000 | Nielsen | 264/540 |
| 6,416,313 B1 | * | 7/2002 | Dohmen et al. | 425/541 |

FOREIGN PATENT DOCUMENTS

| | | | |
|---|---|---|---|
| DE | 19922684 A1 | * 1/2001 | ........... B29C/49/04 |
| EP | 0 050 227 | 4/1982 | |
| JP | 09225999 | 9/1997 | |

* cited by examiner

*Primary Examiner*—Robert B. Davis
(74) *Attorney, Agent, or Firm*—Bereskin & Parr

(57) ABSTRACT

A blow molding mold has first and second fixtures. The first fixture includes drive means, typically in the form of pins, while the second mold fixture has drive receiving means, typically in the form of holes. When the second mold fixture is in registration with the first mold fixture, the drive means are extended to lock and locate the two fixtures together to enable blow molding without a blow molding press. The method of blow molding uses a robotic arm to move a lightweight second mold fixture to accept a parison as it is extruded. After extrusion the arm moves the second fixture toward the first fixture so that the fixtures can be located and locked together. A single robot using a single extrusion head can serve several mold stations depending upon cycle times.

17 Claims, 4 Drawing Sheets

PRESSLESS BLOW MOLDING

FIELD OF THE INVENTION

The present invention relates to an apparatus and method for manufacturing blow molded plastic articles and particularly to manufacturing articles without the need for typical blow molding presses or clamping systems.

BACKGROUND OF THE INVENTION

It is well-known that blow molding is effective in fabricating hollow plastic articles. Typically when molding articles in a blow molding process, a parison is extruded and the parison is accommodated in a suitable cavity in one-half of a blow mold. The more complex the shape of the article, the more complex will be the shape of the mold and the cavity in the mold. For very simple articles, the parison may be extruded to hang vertically and the mold halves may be closed around the parison moving in a horizontal direction. For other slightly more complex parts, particularly larger parts, it may be desirable to place the parison in the mold as the parison is being extruded. When the parison has been accommodated in the lower mold half, the lower mold half is then often moved in a substantially horizontal direction to a molding station. When the lower mold half, accommodating the parison, is in the molding station, a molding press is then used to move the upper mold toward the lower mold half to close the mold prior to blow molding. Substantial force is required in the blow molding press as, in many cases, the press is required to pinch the parison at either end and the resultant flow of plastic material must be accommodated by the press forces, while at the same time the press must close to bring the mating surfaces of the mold halves together. This is required so that the parison does not expand into any space between the mating surfaces of the mold halves during the blowing operation. The press is also required to withstand whatever pressures may be exerted on the mold halves tending to separate them, arising from the pressure of the blowing gas operating over the area of the mold cavity.

The prior art offers several solutions for placing a molten parison in what are usually lower mold halves. For example, one solution involves introducing means for horizontally, (i.e. in an x, y plane) moving the lower mold half beneath the parison extrusion head in such a manner that the parison is dropped within the mold cavity. Molds which are used in typical blow molding are normally quite heavy and hence this solution requires significant effort to effectively and accurately move the mold half.

In some prior art devices, the extrusion head is moved horizontally in an x, y plane so that as the parison is extruded, it is arranged to follow and lie in the cavity in a lower mold half. Extrusion equipment used in typical blow molding is also large and heavy to support the extrusion temperatures and pressures involved and it is costly and cumbersome to move the extrusion head, even in a horizontal plane.

U.S. Pat. No. 5,030,083 to Kohno, teaches the use of a robotic hand to grasp and transport an extruded parison to a remote lower mold half having cavity and place it therein. Where a sizable parison is required, however, the swinging action of the parison induced by its movement by the robot hand can make the path the hand must follow to properly load the parison in the mold, quite complex. Another significant problem is the weight and strength of the molten parison. The parison may break under its own weight during transport from the extrusion head to the mold.

U.S. Pat. No. 5,464,635 to Geiger, discloses the use of a moveable premold having a shape matching the lower mold cavity. A molten parison is extruded into the premold which is moved under the extrusion head, by robotic or other means, to cause the parison, as it is extruded, to be deposited in to the premold cavity. Hence, once loaded with the parison, the premold is transported to the lower mold half and positioned thereover, with the premold and mold cavities substantially aligned. The premold includes openable doors or other similar acting structure so that by opening the structure, the parison is dropped directly into the mold cavity of the lower mold half. This system requires the design of a complex premold with means to accurately release the parison so that it accurately falls into the groove of the lower mold half.

In our co-pending application, we have provided an alternative solution. The alternate solution provided in our co-pending application involves the use of a relatively lightweight lower mold half the lightweight lower mold half comprises a cavity into which the parison is extruded. A robotic arm or other manipulation means is used to move the lightweight lower mold half into a suitable position so that as the parison is extruded from the extrusion head, the lower mold half may be moved so that the parison is extruded directly into place in the mold cavity. Once the extrusion process is completed, the parison is cut and the lightweight lower mold half together with the parison located therein, is then moved to a molding station. At the molding station, the lightweight lower mold half is placed in a lower mold half support. The lower mold half support provides the weight and substance as well as physical support for the lower mold half so that it may be used in a typical mold press or clamp to blow mold parts. The disclosure of our co-pending application is incorporated herein in its entirety by reference.

SUMMARY OF THE INVENTION

In accordance with this invention, a mold assembly comprises a first mold fixture. The first mold fixture includes a first mold cavity. The mold assembly includes a second mold fixture. The second mold fixture includes a second mold cavity. The first and second mold cavities define a complete mold for blow molding a parison. The first mold fixture includes drive means and the second mold fixture includes drive receiving means. The drive means of the first mold fixture and the drive receiving means of the second mold fixture are adapted to locate and lock the second mold fixture against the first mold fixture with the first and second mold cavities in registration to form the complete mold.

In accordance with another aspect of the invention, a process for blow molding parts comprises the use of a first mold fixture and a second mold fixture. The first mold fixture includes a first mold cavity and the second mold fixture includes a second mold cavity. The first and second cavities define a complete mold for blow molding a parison. The first mold fixture includes drive means and the second mold fixture includes drive receiving means. The drive means of the first mold fixture and the drive receiving means of the second mold fixture are adapted to locate and lock the second mold fixture against the first mold fixture with the first and second cavities in registration to form a complete mold. The process further comprises the steps of extruding a parison from an extrusion head. A parison is extruded from the extrusion head. While the parison is being extruded, the second mold fixture is moved so that the parison is extruded to lie within the second mold cavity. The second mold fixture is moved by manipulation means to receive the parison as it is extruded. Manipulation means are also used to translate the second mold fixture from adjacent to the extrusion head to adjacent the first mold fixture so that the second mold fixture is substantially in registry with the first mold fixture. The drive means of the first mold fixture are then extended and are received within the drive receiving means of the second mold fixture. The receipt of the drive means within the drive receiving means locates and locks the first and second mold fixtures in registry to form a complete mold. The process involves blow molding the parison within the first and second fixtures without the need for any outside clamping force.

BRIEF DESCRIPTION OF THE DRAWINGS

For a better understanding of the present invention and to show more clearly how it may be carried into effect, reference will now be made by way of example to the accompanying drawings.

The drawings show a preferred embodiment of the present invention in which.

DETAILED DESCRIPTION OF THE INVENTION

Figure 1:
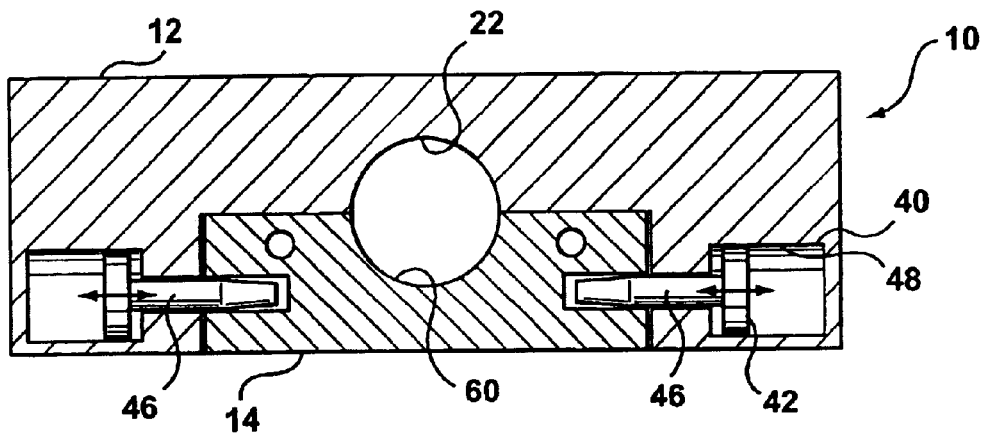
FIG. 1 is cross-sectional view through a mold assembly.
Figure 2:
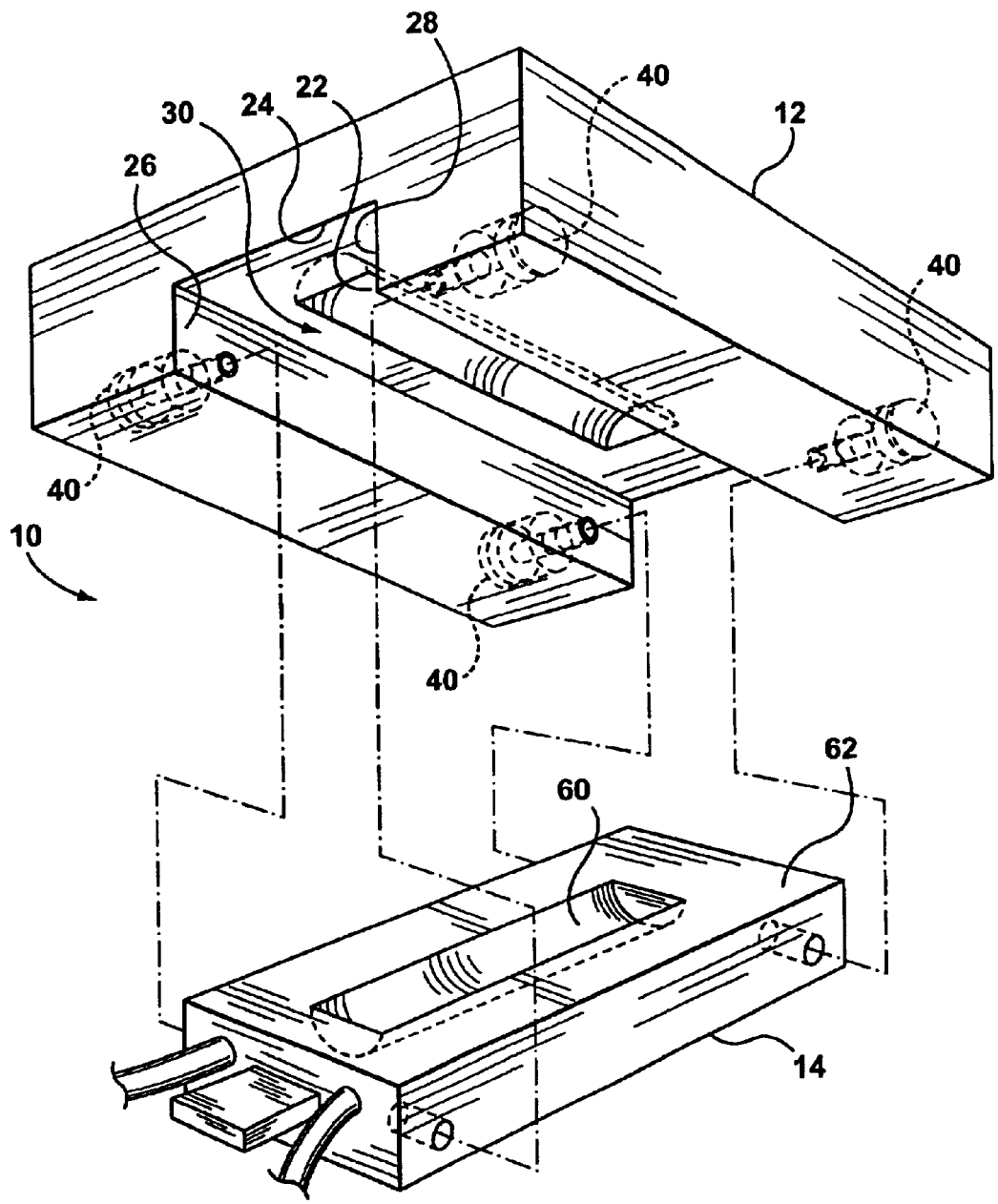
FIG. 2 is a perspective exploded view of the mold assembly of FIG. 1.

With respect to FIGS. 1 and 2, the mold assembly 10 includes a first mold fixture 12 and a second mold fixture 14.

The first mold fixture 12 comprises a first mold cavity 22. The first mold cavity 22 is defined in the mold fixture surface 24. The first mold fixture 12 further comprises a pair of substantially downwardly depending surfaces 26 and 28. The surfaces 24, 26 and 28 define therebetween a receiving recess indicated generally as 30.

The first mold fixture 12 further comprises drive means 40. The drive means 40 include four piston-pin assemblies as shown in FIG. 2. The four piston-pin assemblies, are located so as to extend pins 46 outwardly from the walls 26 and 28 so that upon extension of the pins, the pins project into the recess 30. Upon withdrawal of the pins, the recess 30 is unencumbered. Two of the drive means 40 are shown more clearly in FIG. 1. The drive means 40 include a piston 42 and a pin 46. The piston 42 is moveable within a cylinder 48.

In FIG. 1, the pins 46 are illustrated in the extended position, that is, projecting from the walls 26 and 28 so as to project into the receiving recess 30. The pistons 42 are movable within the chambers 48 by any suitable pressure means. This can be hydraulic or pneumatic so that the piston can be moved, both left and right as shown in FIG. 1, to either extend or retract the pins 46 from the receiving recess 30. The connections for the operating fluid have not been illustrated in FIG. 1. Conventional piston, pin and cylinder assemblies can be used for this purpose.

Figure 3:
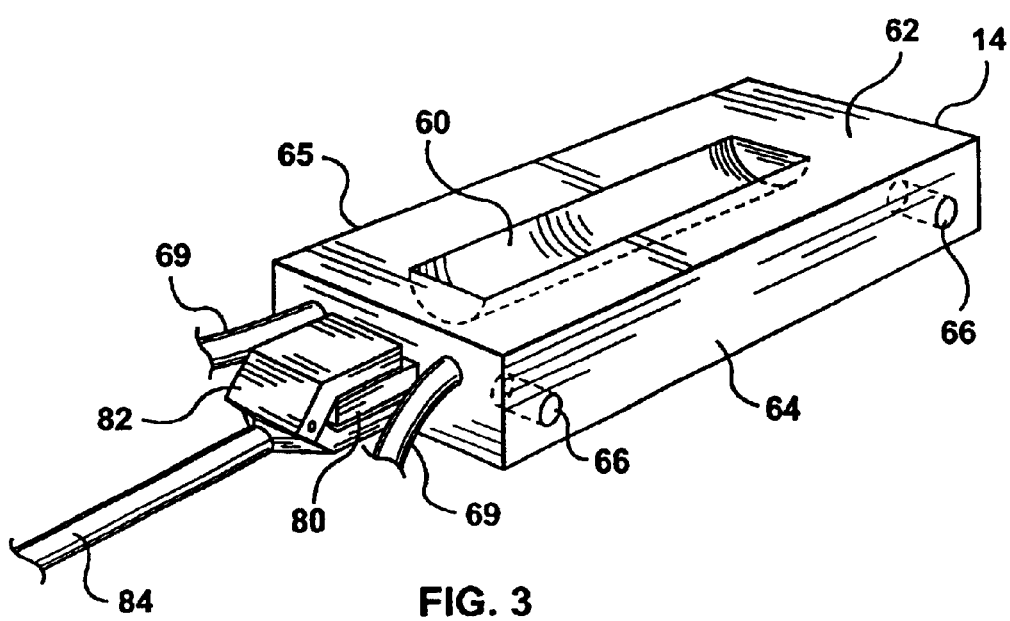
FIG. 3 is a perspective view of one of the components of the mold assembly of FIG. 1 showing the component ready for manipulation.

The second mold fixture 14 is illustrated in FIGS. 2 and 3. The second fixture 14 includes a second mold cavity 60. The mold cavity 60 is defined in the mold fixture surface 62.

The second mold fixture 14 comprises four drive receiving means 66, two of which are visible in FIGS. 2 and 3. In the preferred embodiment the drive receiving means 66 comprise a bore 70 having an axis 72.

The drive receiving means 66 are located so as to receive each of the pins 46 of the drive means 40 of the first mold fixture.

The second mold fixture 14 further comprises a gripper receiving means 80 as shown in FIG. 3. The gripper receiving means may be in the form of a projecting plate or handle. The gripper receiving means is intended to cooperate with the gripper 82 of robot arm 84. Any suitable type of gripper 82 and gripper receiving means 80 may be utilized to facilitate manipulation of the second mold fixture 14 as described more fully below.

The second mold fixture includes side surface 64, which is visible in FIG. 3 and an opposite surface 65.

Figure 4:
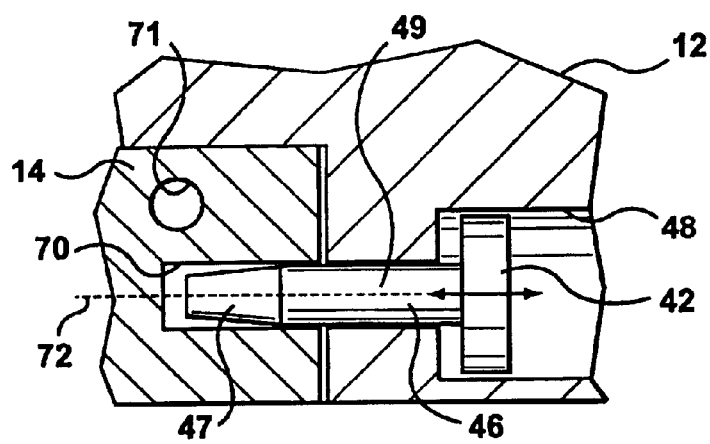
FIG. 4 is an enlarged vertical section of a portion of the mold assembly of FIG. 1.

As illustrated in FIGS. 1, 2 and 3, the second mold fixture 14 is a comparatively smaller structure than the first mold fixture 12. In use, the second mold fixture, being comparatively lighter than first mold fixture 12, may be relatively easily manipulated. Accordingly, in use, a manipulator in the form of robotic arm 84, is used to manipulate the second mold fixture 14 beneath an extrusion head. As a parison is extruded from an extrusion head, the parison can be received within the second mold cavity 60. When the extrusion process is complete, the parison is cut and then lies within the second mold cavity 60. The robotic arm 84 then translates the second mold fixture 14 and moves it into a position within the receiving recess 30 of first mold fixture 12. The robotic arm can move the second fixture 14 until such time as the mold fixture surface 62 is adjacent to the mold fixture surface 24, and in contact therewith. When the mold fixture surface 62 of the second mold fixture is in contact with the mold fixture surface 24 of the first mold fixture, side surface 64 of second mold fixture 14 will be closely adjacent to the depending surface 28 of first mold fixture 12. In addition, side surface 65 of second mold fixture 14 will be adjacent depending surface 26 of first mold fixture 12. When second mold fixture 14 is positioned within the receiving recess 30, of first mold fixture 12, each of the drive receiving means 66 will be aligned with and adjacent to the respective drive means 40 of first fixture 12. When the first and second molds are in registry, then the drive means 40 are operated to cause the pins 46 to project into the recess 30. As the pins are extended into the recess 30, they will engage with the bores 70 of the respective drive receiving means 66. The pins 46 and the bore 70 are sized so that the bore closely accommodates the diameter of the pin 46. This close fit ensures the two fixtures remain in a relative locked position so that the two mold fixtures do not move relatively when the blowing pressure develops. To facilitate entry of the pin 46 into the bore 70, the tip of the pin 46 may be provided with a part conical entry portion 47 as shown in FIG. 4. The axis 49 of the pin 46, may substantially align with the axis 72 of the bore 70. Thus, the extension of the pins 46 into the bores 70 accomplishes the function of closely locating the second fixture 14 with respect to first fixture 12 and also serves to lock the location of second fixture 14 with respect to first fixture 12.

When the second fixture 14 has been locked and located with respect to first fixture 12 as explained above, then the first mold cavity 22 will be in registry with the second mold cavity 60 to form a complete mold cavity. The blow pin assembly which is preferrably part of first mold fixture 12 is then positioned so that the blow pin may be extended to pierce the parison so that a blowing gas may then be delivered to the interior of the parison. This expands the parison so that the parison will assume the configuration of the complete mold cavity comprised of first mold cavity 22 and second mold cavity 60.

Because the drive means 40 extend into the drive receiving means 66 of the second mold portion 14, the second mold portion cannot move relative to the first mold fixture 12 so as to separate surfaces 24 and 62. Thus, there is no need to use a molding press or other clamping pressure. Rather, the complete mold remains intact simply because of the interreaction of the drive means 40 with the drive receiving means 66.

As shown in FIG. 4, the fit of pin 46 within bore 70 is a close fit. Where a cylindrical pin and a cylindrical bore 70 are used as shown in FIG. 4, the tolerances of the pin 46 and bore 70 will have to be carefully controlled so as to ensure that there is no unacceptable separation between the surface 62 of the second mold fixture 14 and surface 24 of the first mold fixture. If desired, the axis 72 and 49 need not be parallel to surfaces 24 and 62. The angled pins would help to limit any unwanted relative movement.

In many cases the robot arm will have sufficient strength so as to move the second mold fixture containing the parison against the first mold fixture and to create enough force between the first and second mold fixtures to effect at least a preliminary air tight seal of the parison. The configuration of the mold cavities and the capacity of the robot arm are selected, where possible, to accomplish this parison seal.

Depending upon the size of the product to be blow molded and the blowing pressures to be used, it may be desirable in some circumstances that the locate and lock structure comprising the drive means 40 and drive receiving means 66 acts to force mold fixture surface 62 against mold fixture surface 24. In such a case, it is desirable to use something other than a cylindrical pin received in a cylindrical bore. Various force developing structures may be incorporated into one or other or both of the drive means and the drive receiving means. In general, the mold assembly may incorporate a camming surface which together with a follower structure generates the desired sealing force. For example, tapered pins and holes can be used. Also, wedge shaped surfaces can be provided.

Figure 6:
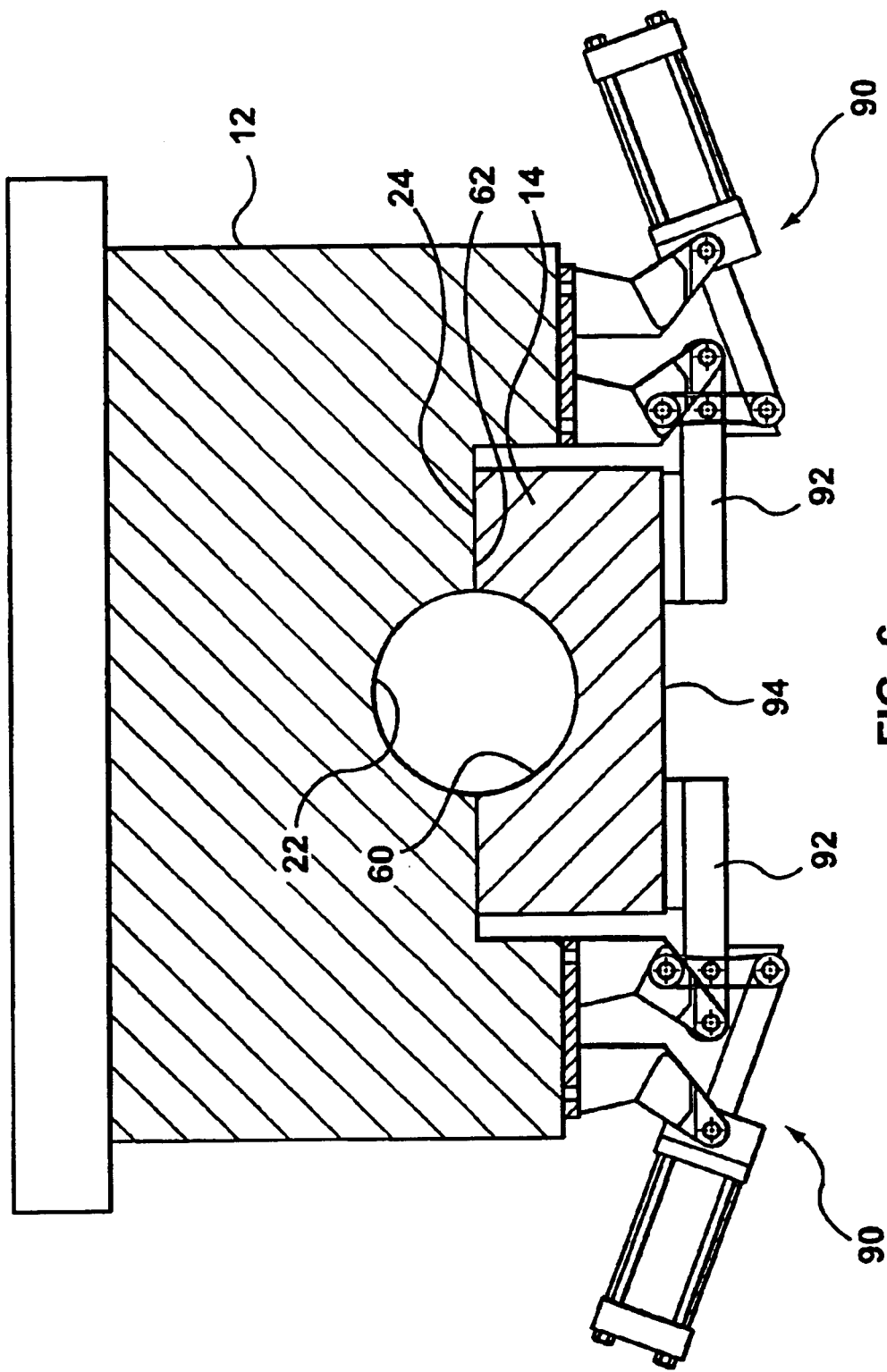
FIG. 6 is a vertical partial sectional view similar to FIG. 1 showing an alternate embodiment.

Alternatively, one or more of any type of commercially available force applying mechanisms can be added to mold fixture 12 that can serve to force mold fixture surfaces 62 and 24 together to compress and pinch the parison as the process requires. An example is shown in FIG. 6 at 90. In this case, the drive means 40 is in the form of a pivoting arm 92 and the drive receiving means is the surface 94 of second mold fixture 14. The force applying mechanism 90 is affixed to first mold fixture 12.

The amount of pressure that would be developed between the surfaces 62 of the second mold fixture 14 and surface 24 of first mold fixture 12 would be a function of the number of separate drive means used, the size of pistons and the pressures available for driving the pistons pushing the pins, wedges or levers to the engaged position. All of these factors can be varied within the scope of this invention to provide sufficient location of the second mold fixture 14 with respect to the first mold fixture 12 to ensure that the complete mold cavity remains intact, as shown in FIG. 1.

Figure 5:
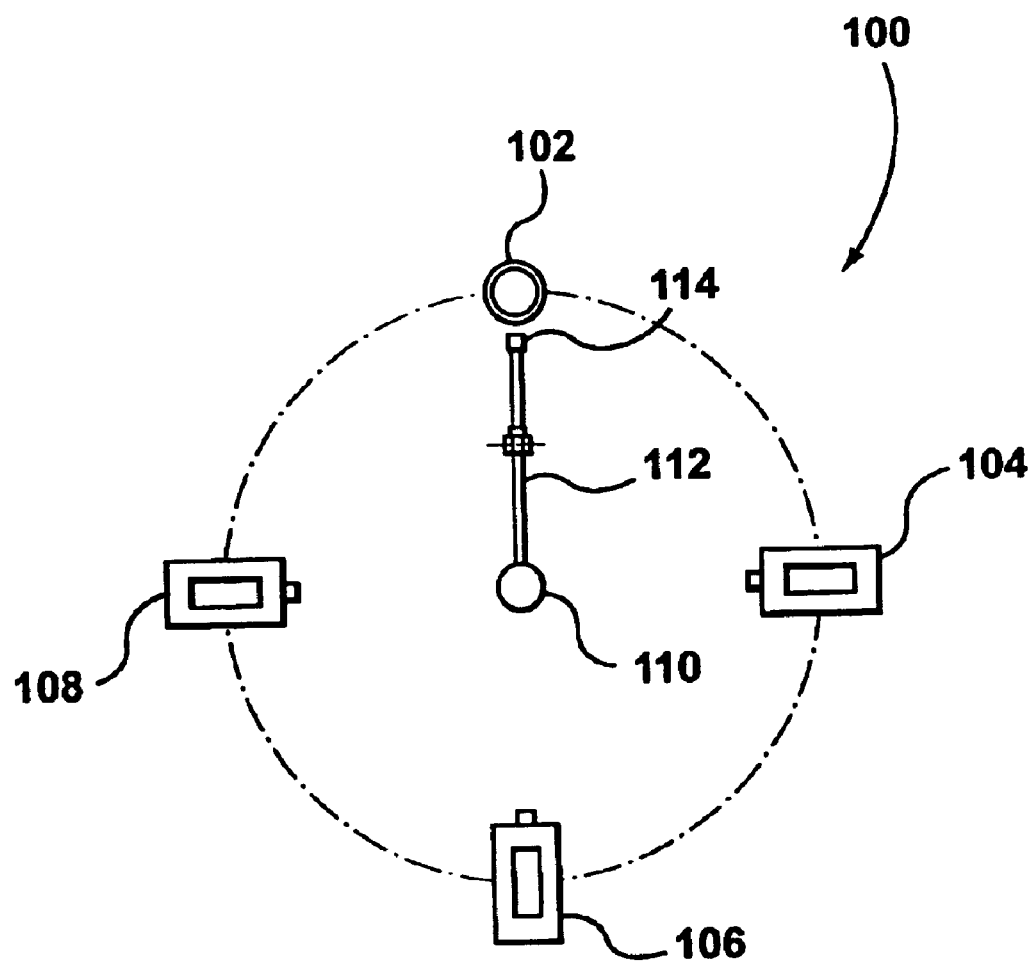
FIG. 5 is a plan view showing a multi-stage manufacturing process using plurality of mold assemblies of the type illustrated in FIG. 1.

While the invention illustrated in FIGS. 1, 2 and 3 may be successfully utilized in a single molding station, the structure as described herein is particularly suited to a multiple stage molding system. Such a system is shown generally at 100 in FIG. 5. The molding apparatus 100 shown in FIG. 5 includes an extrusion head 102, and a plurality of molding stations 104, 106 and 108. The molding system 100 includes a robot 110 having a robotic arm 112. The robotic arm 112 includes a gripper illustrated diagrammatically at 114.

The robot 110 may grasp a first lower mold fixture 14 and move that fixture to beneath the extruder 102. The extruder would then operate to extrude a parison which is received within the mold cavity 60 of the first second mold fixture. With the parison in the mold cavity 60, the second mold fixture could then be moved to the molding station 104. At molding station 104 there would be a first mold fixture 12 similar to that illustrated in FIG. 1. The robotic arm would place the second mold fixture 14 within the first mold fixture 12 at station 104. The drive means of the first molding station would then be operated to locate and lock the mold fixtures of station 104. The gripper would then release and the mold arm 112 would move to station 106. Once the robot arm leaves station 104, the blow molding process can take place at station 104. While that molding process occurs at station 104, the robot can then direct its arm to station 106 where it will grasp the second mold fixture 14 for use at station 106. The blow molding can then occur at station 106. The robotic arm then manipulates the second mold fixture from station 106 to obtain a parison and returns it for locating and locking. While blow molding is occurring at station 106, the robot can direct its arm to station 108 and go through another iteration of the process.

Each of stations 104, 106 and 108 may consist of one pair of first mold fixture and second mold fixture. Alternatively, there may be extra second mold fixtures 14. One of the issues to deal with in blow molding is cooling of the mold fixtures 12 and 14. As mold fixture 12 is a relatively substantial structure, that structure can be cooled by known means such as fluid cooling applied through ducts. As shown in FIG. 3, the second mold fixture 14 may also have a source of cooling fluid which may be supplied through flexible hoses 69. The fluid may flow through internal galleries 71 shown in FIG. 4 to provide cooling of the second mold fixture 14. Sufficient length and flexibility of the cooling hoses 69 will be required to permit the robot 110 to move the respective second fixtures from the appropriate molding stations to the extrusion head and back. As an alternative, if a simpler form of second molding fixture 14 is required, the second mold fixture may not include internal cooling means and the fixtures 14 could be set aside in an ambient cooling station utilizing a fan blowing air over the fixture. In this manner, additional second fixtures 14 would be provided so as to give enough time to cool before being reused.

The number of stations that could be serviced by one robot would depend on a number of factors. These would include the size of parison to be handled, the length of time for the blow molding cycle, including all necessary cooling steps and the like. While three molding stations have been shown in FIG. 5, the invention is not limited to the number of cooling stations which may be as few as one but may include as many as process times and other parameters will permit. Also, the product produced at each mold station can be the same in which case the set of first fixture and second fixture and respective mold cavities would be the same at each station. However, this is not required. A different product could be produced at different mold stations. In this latter case the sets of first and second mold fixtures and their respective cavities would be different at each station. If the different products required different parisons, then the extruder would require programming to extrude the correct parison required for the respective molding station.

The mold fixtures are illustrated in FIG. 2 with the mold fixtures being generally horizontal. The second mold fixture can be moved generally vertically into the receiving recess as shown by the dotted lines. Alternatively, the second mold fixture can be moved into the receiving recess in a generally horizontal direction when the first mold fixture has open ends as shown in FIG. 2. However, there is no requirement that the first mold fixture be maintained in any particular orientation. It may be at a substantial angle to vertical and the direction of approach of the second fixture is similarly not limited. However, the two fixtures will have to be oriented or move in such a manner that the parison does not fall out of the second mold cavity before the fixtures and the two cavities are in registration.

Many other changes and modifications may be made without departing from the scope of this invention which is defined in the attached claims.

What is claimed is:

1. A mold assembly for blow molding a parison,
said assembly comprising,
a first mold fixture and a second mold fixture,
said first mold fixture including a first mold cavity,
said second mold fixture including a second mold cavity,
said first and second mold cavities defining a complete mold for blow molding a parison,
said first mold fixture including drive means and said second mold fixture including drive receiving means,
and wherein said drive means and said drive receiving means are adapted to locate and lock said second mold fixture against said first mold fixture with said first and second mold cavities in registration to form the complete mold,
wherein said first mold fixture is substantially U-shaped and said U shape defines a receiving recess adapted to receive said second mold fixture therein when said first and second mold cavities are in registration.

2. The mold assembly of claim 1 wherein said drive means includes at least one pin.

3. The mold assembly of claim 2 wherein said drive receiving means includes at least one hole for closely receiving said at least one pin.

4. The mold assembly of claim 3 wherein said at least one pin is movable between a first position in which said at least one pin does not enter into said receiving recess and a second position in which said at least one pin does extend into said receiving recess.

5. The mold assembly of claim 1 wherein said first mold cavity is defined in a first molding surface of said first fixture and said second mold cavity is defined in a second molding surface of said second fixture and said drive means and said drive receiving means are adapted to force said second molding surface against said first molding surface.

6. The mold assembly of claim 4 wherein said drive means includes at least two pins and said drive receiving means includes at least two holes adapted to closely receive said at least two pins.

7. The mold assembly of claim 6 wherein said drive means includes four pins and said drive receiving means includes four holes adapted to closely receive said pins.

8. The mold assembly of claim 5 wherein at least one of said drive means and said drive receiving means includes a camming surface for forcing said second molding surface against said first molding surface.

9. The mold assembly of claim 1 wherein said second mold fixture includes grasping means so that said second mold fixture may be grasped by a robotic arm.

10. The mold assembly of claim 9 wherein said first mold fixture includes fluid means for operating said drive means to move said drive means between a first position in which said drive means does not engage said drive receiving means and a second position in which said drive means may engage said drive receiving means.

11. A process for blow molding a parison comprising;
providing a first mold fixture and a second mold fixture, said first mold fixture and said second mold fixture having respective first and second mold cavities, the first mold fixture including drive means, the second mold fixture including drive receiving means wherein the drive means of the first mold fixture and the drive receiving means of the second mold fixture are adapted to locate and lock the second mold fixture against the first mold fixture with said first and second respective mold cavities in registration to form a complete mold,
the process further comprising;
placing a parison in said second mold cavity of said second fixture, by manipulating said second mold fixture beneath an extrusion head from which said parison is extruded using a robotic arm,
operating said drive means and said drive receiving means to locate and lock said second mold fixture against said first mold fixtures with said first and second mold cavities in registration, and
blow molding said parison without use of any external clamping force.

12. A process further comprising;
providing a first mold fixture and a second mold fixture, said first mold fixture and said second mold fixture having respective first and second mold cavities, the first mold fixture including drive means, the second mold fixture including drive receiving means wherein the drive means of the first mold fixture and the drive receiving means of the second mold fixture are adapted to locate and lock the second mold fixture against the first mold fixture with said first and second respective mold cavities in registration to form a complete mold,
providing a robot capable of grasping and translating said second mold fixture,
the process further comprising;
grasping said second mold fixture with said robot,
extruding a parison from an extrusion head,
maneuvering said second mold fixture by means of said robot while said parison is received within said second mold cavity of said second mold fixture,
translating said second mold fixture containing said parison from adjacent said extrusion head to adjacent said first mold fixture until said second mold fixture is substantially in registry with said first mold fixture,
extending said drive means so that said drive means are received by said drive receiving means to lock and locate said first and second mold fixtures in registry to form a complete mold, and
blow molding said parison within said first and second mold fixtures, without use of any external clamping force.

13. The process of claim 12 wherein said step of extending said drive means includes pre-sealing said parison.

14. The process of claim 13 wherein said step of extending said drive means further includes forcing said second mold fixture against said first mold fixture.

15. The process of claim 12 wherein said process further comprises provided a plurality of sets of first and second said mold fixtures, each such set located at a molding station, said process including the step of using a single robot and a single extrusion head, with said robot translating said second mold fixture of each set from adjacent said extrusion head for receiving a parison to adjacent the respective first mold fixture at each said station, and blow molding a respective parison at each of said molding stations.

16. The process of claim 15 wherein the second mold cavities of each of said second mold fixtures at each of said molding stations is the same.

17. The process of claim 15 wherein the second mold cavities of each of said second mold fixtures at each of said molding stations is different.

* * * * *